(12) United States Patent
Johnson

(10) Patent No.: US 7,717,472 B2
(45) Date of Patent: May 18, 2010

(54) METHOD OF LOCKING TUBULAR COMPONENTS IN END TO END RELATION

(76) Inventor: Orren Johnson, 6904 - 41 A Avenue, Edmonton, AB (CA) T6K 0S9

(*) Notice: Subject to any disclaimer, the term of this patent is extended or adjusted under 35 U.S.C. 154(b) by 591 days.

(21) Appl. No.: 11/671,992

(22) Filed: Feb. 6, 2007

(65) Prior Publication Data

US 2008/0012317 A1    Jan. 17, 2008

(30) Foreign Application Priority Data

Feb. 7, 2006    (CA) .................................... 2537171

(51) Int. Cl.
*E21B 7/08*    (2006.01)
(52) U.S. Cl. .................... 285/91; 285/321; 175/61; 175/74; 175/256
(58) Field of Classification Search .............. 285/276, 285/321, 277, 91; 175/74, 256, 61
See application file for complete search history.

(56) References Cited

U.S. PATENT DOCUMENTS

| | | | |
|---|---|---|---|
| 3,345,085 A * | 10/1967 | Hanes | 285/27 |
| 3,345,087 A * | 10/1967 | Hanes et al. | 285/39 |
| 3,521,911 A * | 7/1970 | Hanes et al. | 285/27 |
| 3,606,393 A * | 9/1971 | Huntsinger et al. | 285/90 |
| 4,519,633 A * | 5/1985 | Nichols | 285/3 |
| 4,607,865 A * | 8/1986 | Hughes | 285/18 |
| 4,718,701 A * | 1/1988 | Vigneron et al. | 285/91 |
| 4,813,497 A | 3/1989 | Wenzel | |
| 5,048,621 A | 9/1991 | Bailey | |
| 5,052,501 A | 10/1991 | Wenzel | |
| 5,101,914 A | 4/1992 | Wenzel | |
| 5,101,915 A | 4/1992 | Witte | |
| 5,269,385 A | 12/1993 | Sihlis | |
| 5,343,966 A | 9/1994 | Wenzel | |
| 6,543,554 B2 | 4/2003 | Smith | |
| 6,550,818 B2 | 4/2003 | Robin | |
| 6,799,646 B1 | 10/2004 | Daigle | |
| 6,905,148 B2 * | 6/2005 | Nguyen et al. | 285/321 |

FOREIGN PATENT DOCUMENTS

CA    2025653 A1    3/1992
CA    2472639 A1    7/2005

* cited by examiner

*Primary Examiner*—David E Bochna
(74) *Attorney, Agent, or Firm*—Christensen O'Connor Johnson Kindness PLLC

(57) ABSTRACT

A method of locking tubular components in end to end relation. A first tubular body is provided having a tongue with an outwardly facing groove protruding past one end along an interior surface that has a keyway. A second tubular body is provided having a tongue with an inwardly facing groove protruding past one end along an exterior surface. A split ring is positioned in the grooves to connect the bodies. The split ring has a tapered outer surface to permit removal by an axial force. A tubular insert carries a locking key which engages the axial keyway. When the tubular insert is fully inserted into the first tubular body, the key underlies the split ring and prevents the split ring from having sufficient clearance to be withdrawn.

3 Claims, 5 Drawing Sheets

SECTION 'A - A'

SECTION 'B - B'

METHOD OF LOCKING TUBULAR COMPONENTS IN END TO END RELATION

FIELD OF THE INVENTION

The present invention relates to method of locking tubular components in end to end relation and an adjustable bent housing constructed in accordance with the teachings of the method.

BACKGROUND OF THE INVENTION

U.S. Pat. No. 5,052,501 discloses an earth drilling tool known as an "adjustable bent housing" fabricated from tubular components. The angle of deviation of this tool is adjustable by loosening a threaded connection and effecting a relative rotation of components. It is important that the remaining tubular components do not separate during adjustment.

SUMMARY OF THE INVENTION

According to the present invention there is provided a method of locking tubular components in end to end relation. A first step involves providing a first tubular body having a first end, a second end, an axis, an interior surface, an exterior surface, and an interior circumferential tongue protruding past the second end along the interior surface. The interior circumferential tongue has an outward facing groove adapted to receive a split ring. The interior surface has an axial keyway. A second step involves providing a second tubular body having a first end, a second end, an axis which is co-axial with the axis of the first tubular body, an interior surface, an exterior surface, and an exterior circumferential tongue protruding past the first end along the exterior surface and adapted to overlap the interior circumferential tongue. The exterior circumferential tongue has an inwardly facing groove adapted to receive a split ring. A third step involves positioning a split ring in the outwardly facing groove of the interior circumferential tongue of the first tubular body and overlapping the exterior circumferential tongue of the second tubular body to position the split ring in the inwardly facing groove. The split ring serves to connect the first tubular body and the second tubular body. However, the split ring has a tapered outer surface. An axial force will separate the first tubular body and the second tubular body by causing the split ring to collapse and slide inwardly due to the force exerted by the inwardly facing groove upon the tapered outer surface of the split ring, until the split ring is withdrawn from the inwardly facing groove, thereby releasing the first tubular body and the second tubular body. A fourth step involves providing a tubular insert which is adapted for insertion into the first tubular body. Means are provided to secure the tubular insert within the first tubular body. A fifth step involves providing a key carried by the tubular insert. The key is adapted to engage the axial keyway. When the tubular insert is fully inserted into the first tubular body, the key underlies the split ring and prevents the split ring from having sufficient clearance to be withdrawn from the inwardly facing groove, thereby locking the first tubular body and the second tubular body together.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The preferred method of locking tubular components in end to end relation will now be described with reference to FIGS. 1 through 10.

Figure 1:
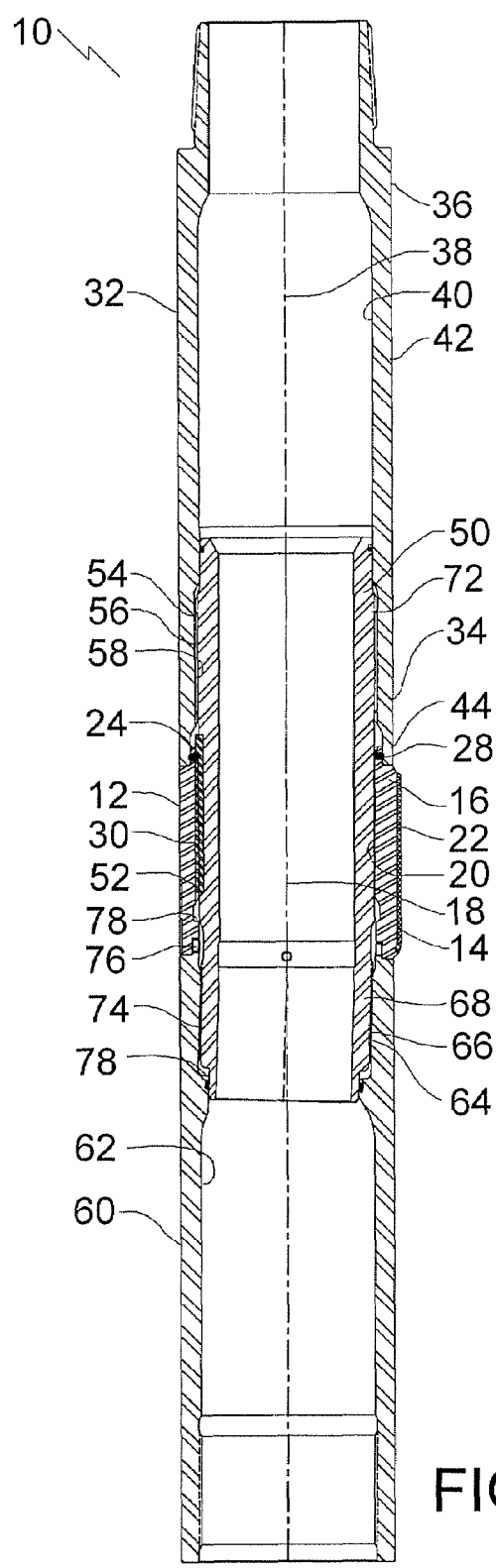
FIG. 1 is a side elevation view, in section, of an adjustable bent housing constructed in accordance with the teachings of the present method.
Figure 4:
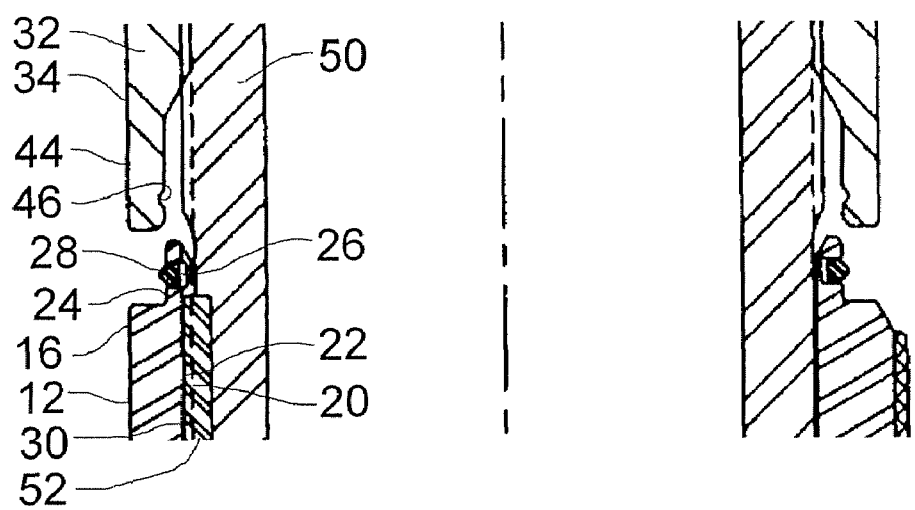
FIG. 4 is an enlarged side elevation view, in section, of a portion of the adjustable bent housing illustrated in FIG. 2 in the vicinity of section lines A-A, shown in the separated position.

Method:

Referring now to FIG. 1, the method of locking tubular components in end to end relation begins by providing a first tubular body 12 having a first end 14, a second end 16, an axis 18, an interior surface 20, an exterior surface 22, and an interior circumferential tongue 24 protruding past second end 16 along interior surface 20. Referring to FIG. 4, interior circumferential tongue 24 has an outward facing groove 26 adapted to receive a split ring 28, while interior surface 20 has an axial keyway 30. Referring again to FIG. 1, a second tubular body 32 is also provided that has a first end 34, a second end 36, an axis 38 which is co-axial with axis 18 of first tubular body 12, an interior surface 40, an exterior surface 42, and an exterior circumferential tongue 44 protruding past first end 34 along exterior surface 42. Referring again to FIG. 4, exterior circumferential tongue 44 is adapted to overlap interior circumferential tongue 24 (although shown in the separated position in FIG. 4)) and has an inwardly facing groove 46 adapted to receive split ring 28.

Figure 5:
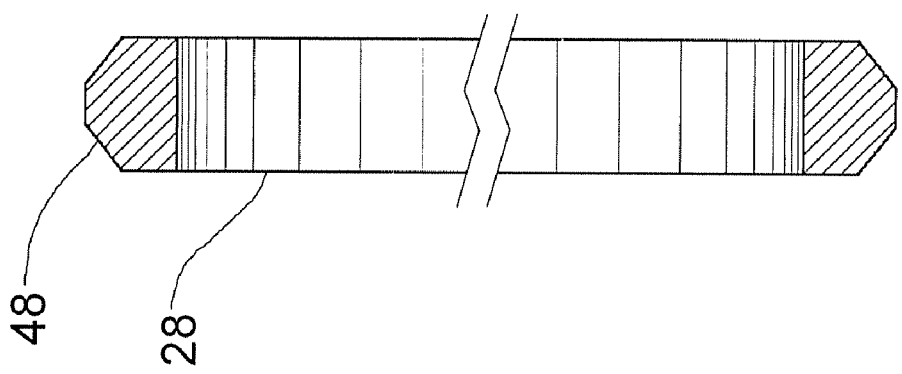
FIG. 5 is a cross-section view of the split ring illustrated in FIG. 3 and FIG. 4.
Figure 6:
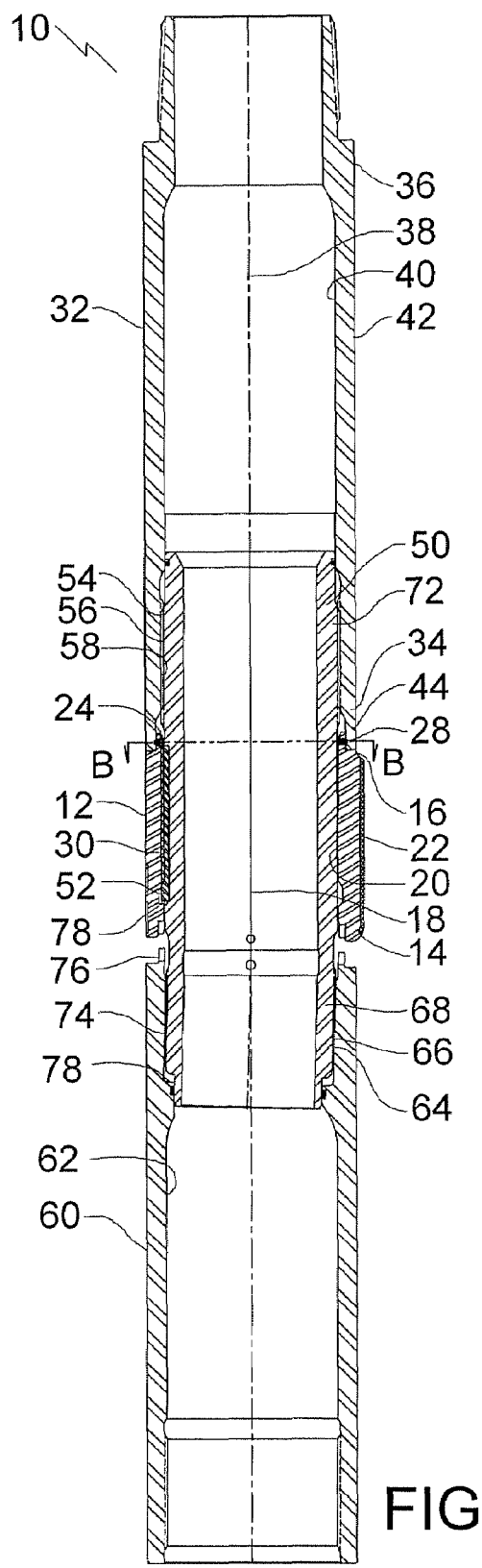
FIG. 6 is a side elevation view, in section, of the adjustable bent housing illustrated in FIG. 1 with the split ring unconstrained by the key.
Figure 8:
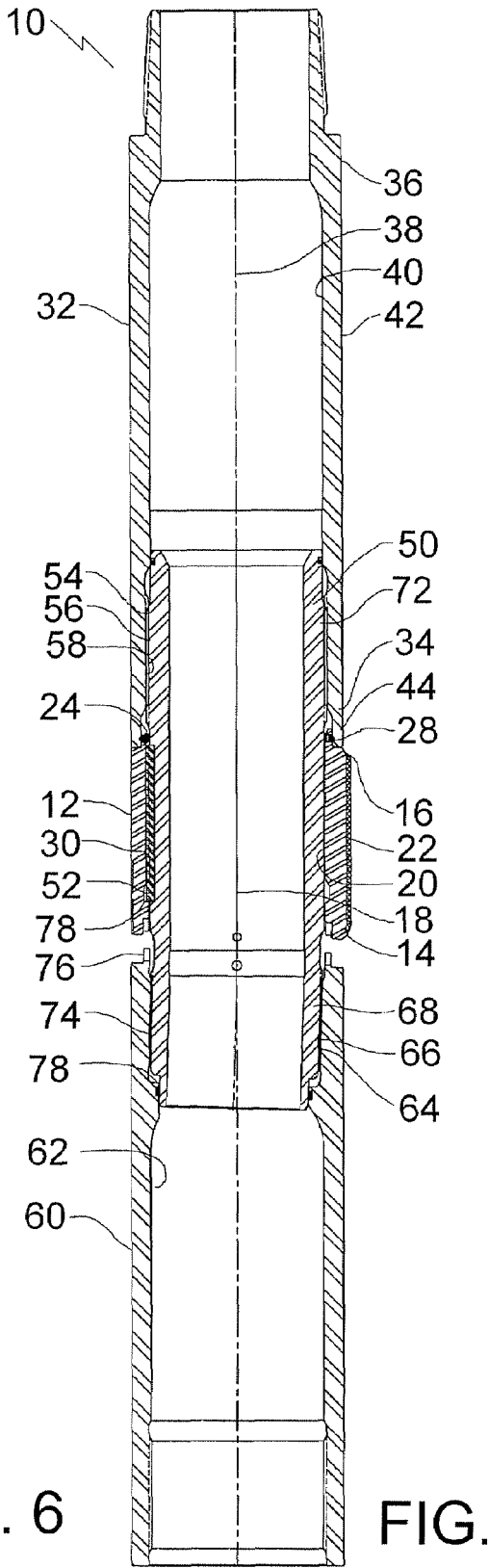
FIG. 8 is a side elevation view, in section, of the adjustable bent housing illustrated in FIG. 1 with shoulder engagement as preliminary step to disengaging split ling.
Figure 9:
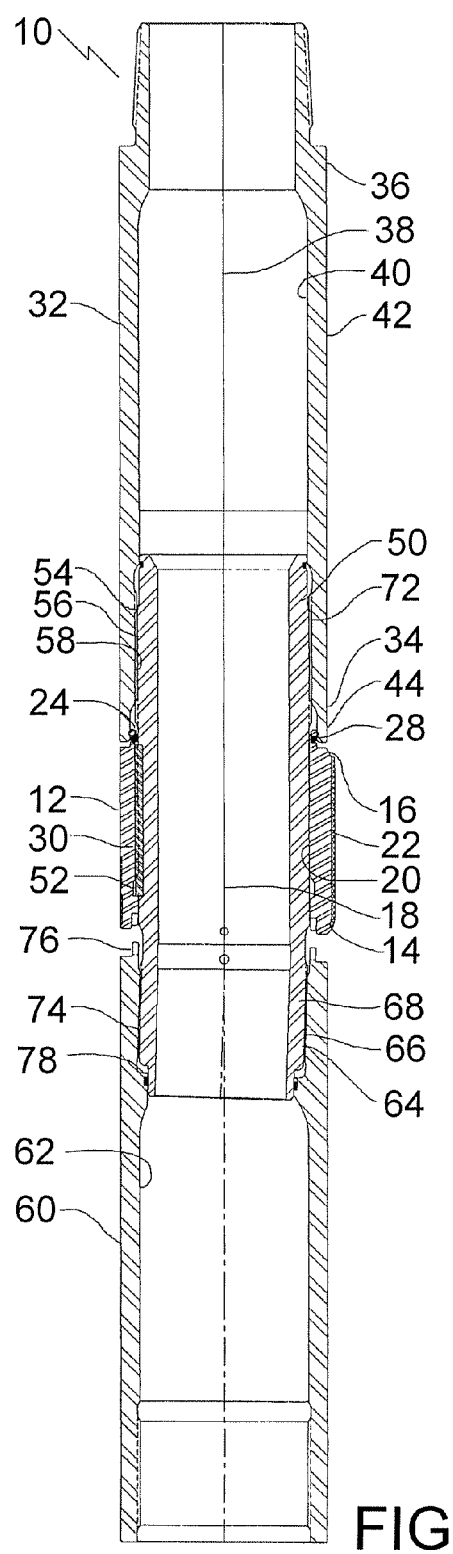
FIG. 9 is a side elevation view, in section, of the adjustable bent housing illustrated in FIG. 1 with spit ring partially disengaged.
Figure 10:
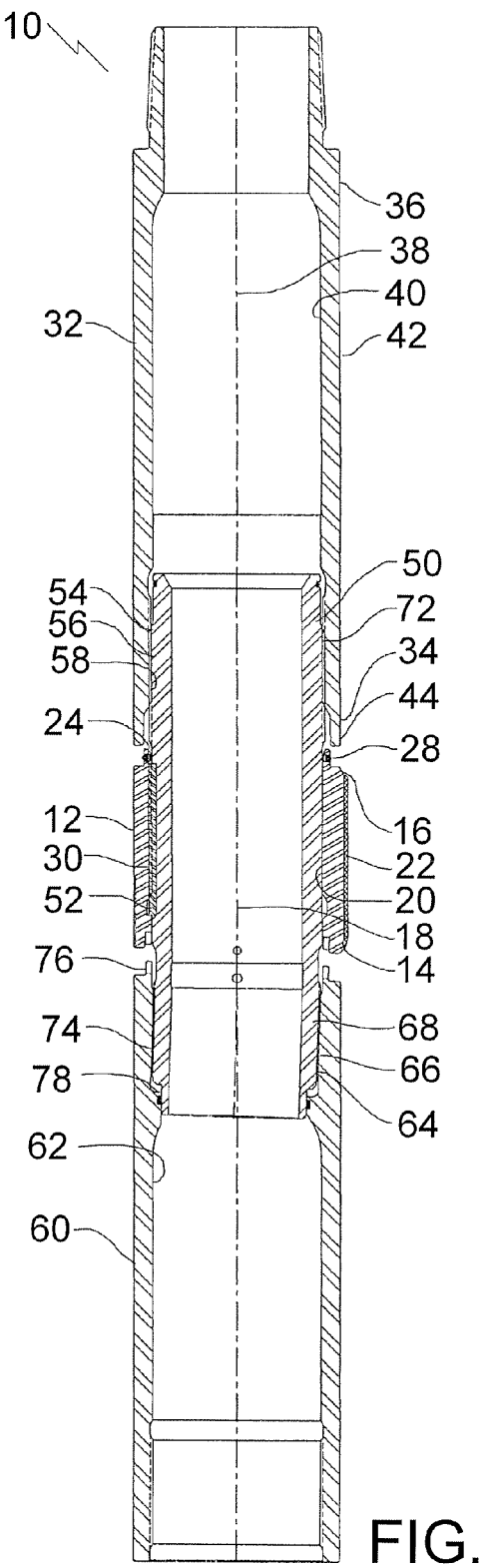
FIG. 10 is a side elevation view, in section, of the adjustable bent housing illustrated in FIG. 1 with split ring completely disengaged.

Split ring 28 is then positioned in outwardly facing groove 26 of interior circumferential tongue 24 of first tubular body 12 and overlapping exterior circumferential tongue 44 of second tubular body 32 to position split ring 28 in inwardly facing groove 46. As can be seen, there is a small space between split ring 28 and the bottom of outwardly facing groove 26 to allow split ring 28 to contract inwards when pressure is applied. Referring to FIG. 1, split ring 28 thus serves to connect first tubular body 12 and second tubular body 32. Referring to FIG. 5, split ring 28 has a tapered outer surface 48. Referring to FIGS. 8-10, first tubular body 12 and second tubular body 32 are separated by applying an axial force pulling the two apart, such that the force causes split ring 28 to collapse and slide inwardly due to the force exerted by inwardly facing groove 46 upon tapered outer surface 48 of split ring 28 until split ring 28 is withdrawn from inwardly facing groove 46. In this manner, first tubular body 12 and second tubular body 32 are released. One method of creating this axial force is by rotating threads 64 and 66 relative to each other as described in more detail below.

Referring to FIG. 1, a tubular insert 50 is also provided that is adapted to be inserted and secured into first tubular body 12. As depicted, tubular insert 50 is secured by engaging external threads 54 on the exterior surface 56 of tubular insert 50 with internal threads 58 on interior surface 40 of second tubular body 32. Referring to FIG. 4, a key 52 that is carried by tubular insert 50 is also provided, where key 52 engages axial keyway 30. It will be understood that more than one key may be present. Referring again to FIG. 1, when tubular insert 50 is fully inserted into first tubular body 12, key 52 underlies split ring 28 and prevents it from having sufficient clearance to be withdrawn from inwardly facing groove 46. This acts to lock first tubular body 12 and second tubular body 32 together against any axial forces.

Practical Application of the Method to an Adjustable Bent Housing

An adjustable bent housing has been selected to demonstrate the practical application of the present invention. It will be appreciated by one skilled in the alt that the method has broader application and may be incorporated into with other down hole oil tools and in other applications. For reasons of clarity, the same reference numerals used to introduce components in the description of the method above will now, wherever possible, be used to describe the components incorporated into the adjustable bent housing.

Referring now to FIG. 1, there is shown adjustable bent housing, indicated generally by reference numeral 10. Adjustable bent housing 10 includes first tubular body 12 (known in this application as a crown or adjustment sleeve), second tubular body 32 (know in this application as an upper housing), third tubular body 60 (known in this application as a lower housing) and tubular insert 50 (known in this application as an inner mandrel). First, second and third tubular bodies 12, 32, and 60 are arranged in end to end relation with crown 12 disposed between upper housing 32 and lower housing 60. Upper housing 32 has interior surface 40 with internal threads 58 and lower housing 60 has an interior surface 62 with internal threads 64. External threads 66 at the first end 68 of inner mandrel 50 engage internal threads 64 of lower housing 60, and external threads 54 at the second end 72 of inner mandrel 50 engage internal threads 58 of upper housing 32.

A means of creating an axial offset are also provided, such that relative rotation of crown 12 and lower housing 60 results in a change in the angle of deviation. The means for creating axial offsets are well known in the art and, for that reason, will not be described in great detail. The primary means for creating axial offsets include machining portions of the tubular bodies to intentionally create an offset. This can be the body or the threads. Here, an offset 74 is shown as having been created in the threaded connection.

There is also provided an engagement means between the crown 12 and the lower housing 60. The engagement means are typically in the form of engagement teeth 76, commonly known as a dog clutch. Dog clutch 76 prevents relative rotation of crown 12 and lower housing 60 when crown 12 and lower housing 60 are in abutting relation. When dog clutch 76 is released, as in FIG. 2, however, lower housing 60 is free to rotate relative to crown 12. Crown 12 has interior circumferential tongue 24 protruding past second end 16 along interior surface 20. Interior surface 20 has axial keyway 30. Axis 18 of crown 12 is co-axial with axis 38 of upper housing 32. Upper housing 32 has exterior circumferential tongue 44 protruding past first end 34 along exterior surface 42 that is adapted to overlap interior circumferential tongue 24. In the locking position, split ring 28 is positioned in outwardly facing groove 26 of interior circumferential tongue 24 of crown 12 and inwardly facing groove 46 of overlapping exterior circumferential tongue 44 of upper housing 32, such that split ring 28 serves to connect crown 12 and upper housing 32. Referring to FIG. 5, split ling 28 has tapered outer surface 48 such that, referring to FIGS. 8-10, when adequate clearance is provided, an axial force will separate crown 12 and upper housing 32 by causing split ring 28 to collapse and slide inwardly due to the force exerted by inwardly facing groove 46 upon tapered outer surface 48 of split ring 28 until split ring 28 is withdrawn from inwardly facing groove 46, thereby releasing crown 12 and upper housing 32. Key 52 of inner mandrel 50 engage axial keyway 30 to prevent relative rotation of crown 12 and inner mandrel 50. Referring to FIG. 1, when inner mandrel 50 is fully inserted into crown 12, key 52 underlie split ring 28 and prevents split ring 28 from having sufficient clearance to be withdrawn from inwardly facing groove 46, thereby locking crown 12 and upper housing 32 together.

Operation:

The use and operation of the present invention will be discussed with reference to an adjustable bent housing, indicated generally by reference numeral 10. It will be understood that the operation described herein can be adapted by those skilled in the art to other situations.

Figure 2:
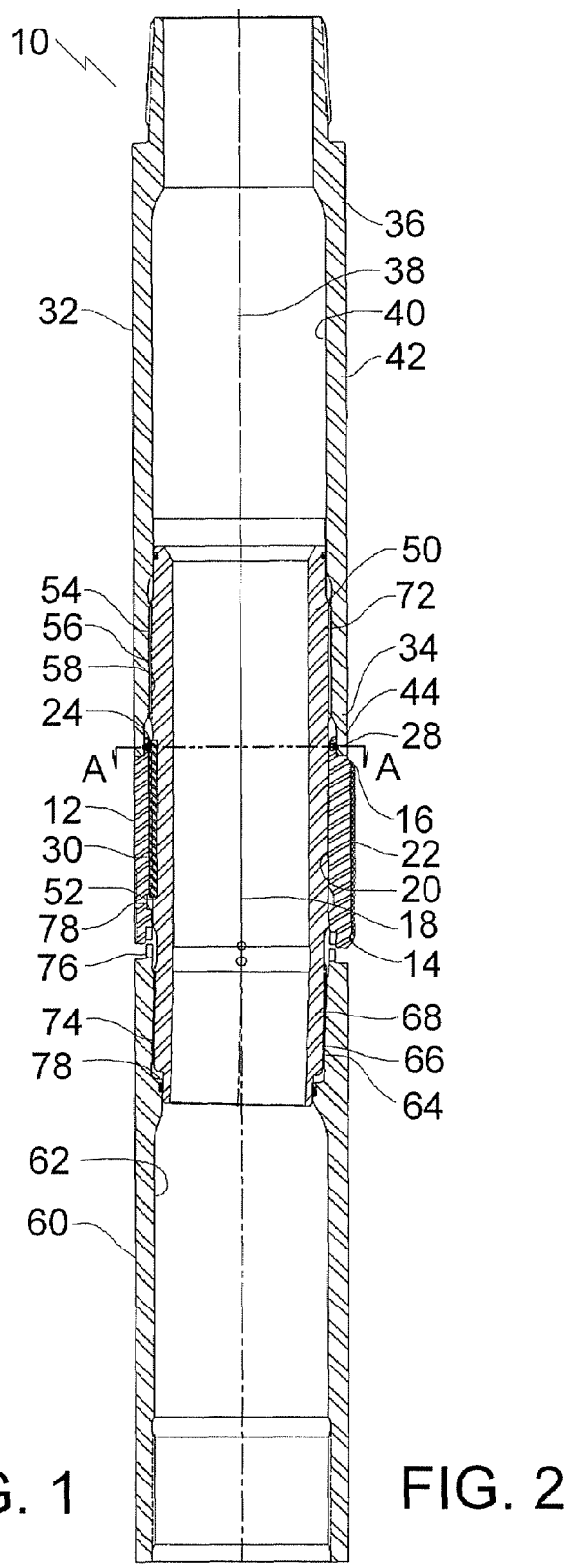
FIG. 2 is a side elevation view, in section, of the adjustable bent housing illustrated in FIG. 1 with a lower housing disengaged in preparation for changing the angle of deviation.
Figure 3:
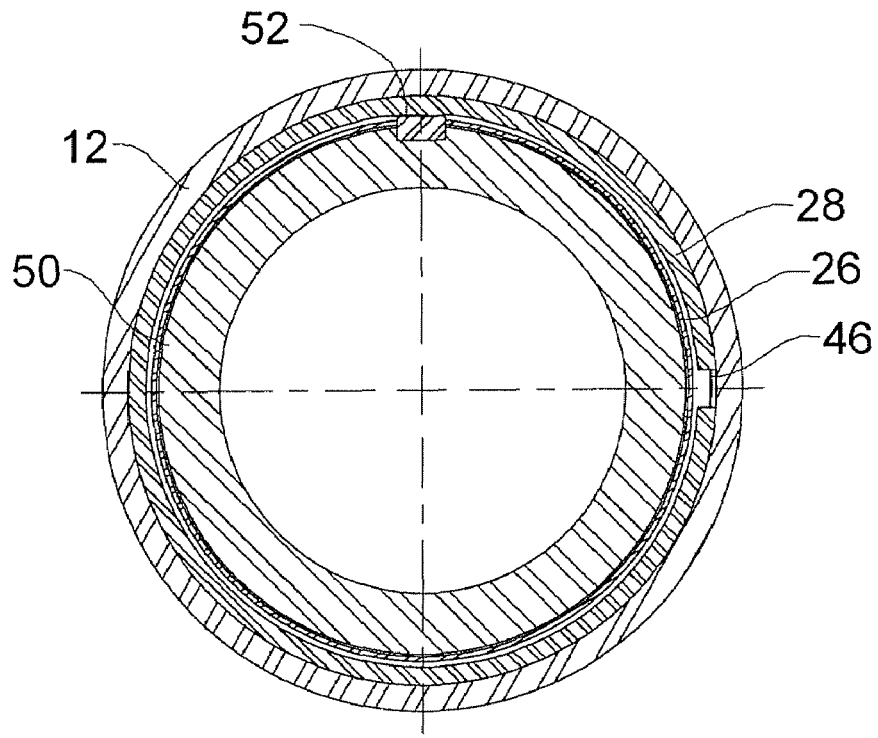
FIG. 3 is a cross-section view of the adjustable bent housing taken along section lines A-A of FIG. 2.
Figure 7:
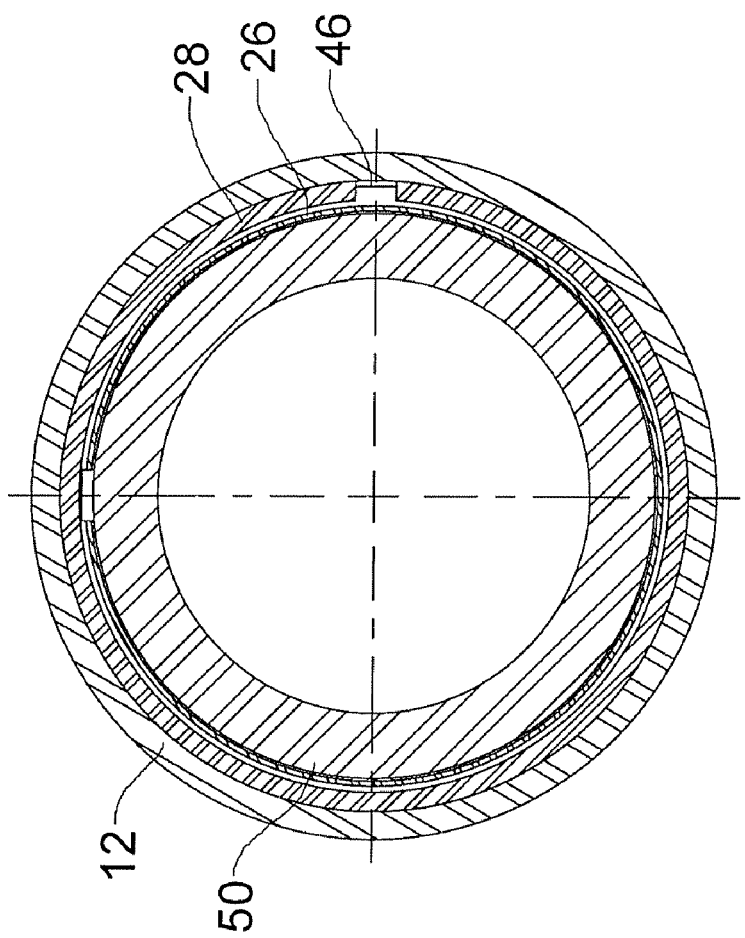
FIG. 7 is a cross-section view of the adjustable bent housing taken along section lines B-B of FIG. 6.

Referring now to FIG. 1, adjustable bent housing 10 is provided as described above in a straightened, locked position. Referring to FIG. 2, once it is desired to adjust the bend of housing 10, dog clutch 76 is opened by rotating upper housing 32 such that internal threads 58 move up along external threads 54 of inner mandrel 50. As crown 12 is attached to upper housing 32 by split ring 28, crown 12 moves up with upper housing 32, by sliding along exterior surface 56 of inner mandrel 50. Key 52 carried by inner mandrel 50 and received by axial keyway 30 to prevent rotation of crown 12. Upper housing 32 is rotated enough to open dog clutch 76 such that lower housing 60 is free to rotate with respect to crown 12 to adjust the angle of housing 10 using offset 74, as is known in the art. At this point, referring to FIG. 3, split ring 28 is prevented from withdrawing from inwardly facing groove 46 by key 52 positioned under split ring 28. When it is desired to separate upper housing 32 and crown 12, referring to FIG. 6, upper housing 32 is rotated further to draw crown 12 further up inner mandrel 50 such that key 52 no longer underlies split ring 28. Referring to FIG. 7, this creates a clearance that allows split ring 28 to withdraw from inwardly facing groove 46 into outward facing groove 26 upon the application of an axial force. Referring to FIG. 8, upper housing 32 is again rotated further until the end of key 52 that is opposite split ring 28 is positioned immediately adjacent an inner shoulder 78 of crown 12. Referring to FIG. 9, as upper housing 32 continues to rotate, crown 12 is constrained by the contact between shoulder 78 and key 52 such that it is no longer free to move upwards with upper housing 32. This creates an axial force, and causes inwardly facing groove 46 to apply a force to tapered outer surface 48 (shown in FIG. 5) of split ring 28, causing it to collapse and slide inward into outward facing groove 26, thus with drawing from inward facing groove 46. Referring to FIG. 10, upper housing 32 can then be rotated until exterior circumferential tongue 44 no longer overlaps interior circumferential tongue 24.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A method of locking tubular components in end to end relation, comprising the steps of:

providing a first tubular body having a first end, a second end, an axis, an interior surface, an exterior surface, and an interior circumferential tongue protruding past the second end along the interior surface, the interior circumferential tongue having an outward facing groove adapted to receive a split ring, the interior surface having an axial keyway;

providing a second tubular body having a first end, a second end, an axis which is co-axial with the axis of the first tubular body, an interior surface, an exterior surface, and an exterior circumferential tongue protruding past the first end along the exterior surface and adapted to overlap the interior circumferential tongue, the exterior circumferential tongue having an inwardly facing groove adapted to receive a split ring;

positioning a split ring in the outwardly facing groove of the interior circumferential tongue of the first tubular body and overlapping the exterior circumferential tongue of the second tubular body to position the split ring in the inwardly facing groove, such that the split ring serves to connect the first tubular body and the second tubular body, the split ring having a tapered outer surface, such that an axial force will separate the first tubular body and the second tubular body by causing the split ring to collapse and slide inwardly due to the force exerted by the inwardly facing groove upon the tapered outer surface of the split ring until the split ring is withdrawn from the inwardly facing groove, thereby releasing the first tubular body and the second tubular body;

providing a tubular insert which is adapted for insertion into the first tubular body, with means being provided to secure the tubular insert within the first tubular body; and providing a key carried by the tubular insert, the key engaging the axial keyway, when the tubular insert is fully inserted into the first tubular body the key underlies the split ring and prevents the split ring from having sufficient clearance to be withdrawn from the inwardly facing groove, thereby locking the first tubular body and the second tubular body together.

2. The method as defined in claim 1, the interior surface of the second tubular body having internal threads, the tubular insert having an exterior surface with external threads, the means to secure the tubular insert within the first tubular body being to engage the external threads of the tubular insert with the internal threads of the second tubular body.

3. An adjustable bent housing, comprising:

a first tubular body, a second tubular body and a third tubular body arranged in end to end relation with the first tubular body disposed between the second tubular body and the third tubular body, the second tubular body having an interior surface with internal threads and the third tubular body having an interior surface with internal threads;

a tubular insert having a first end, a second end, and an exterior surface with external threads at the first end and the second end, the external threads at the first end engaging the internal threads of the third tubular body and the external threads at the second end engaging the internal threads of the second tubular body;

means being provided to create an axial offset, such that relative rotation of the second tubular body and the third tubular body results in a change in the angle of deviation;

engagement means between the first tubular body and the third tubular body, the engagement means preventing relative rotation of the first tubular body and the third tubular body when the first tubular body and the third tubular body are in abutting relation;

the first tubular body having a first end, a second end, an axis, an exterior surface, and an interior circumferential tongue protruding past the second end along the interior surface, the interior circumferential tongue having an outward facing groove adapted to receive a split ring, the interior surface having an axial keyway;

the second tubular body having a first end, a second end, an axis which is co-axial with the axis of the first tubular body, an exterior surface, and an exterior circumferential tongue protruding past the first end along the exterior surface and adapted to overlap the interior circumferential tongue, the exterior circumferential tongue having an inwardly facing groove adapted to receive a split ring;

a split ring positioned in the outwardly facing groove of the interior circumferential tongue of the first tubular body and the inwardly facing groove of the overlapping exterior circumferential tongue of the second tubular body, such that the split ring serves to connect the first tubular body and the second tubular body, the split ring having a tapered outer surface, such that an axial force will separate the first tubular body and the second tubular body by causing the split ring to collapse and slide inwardly due to the force exerted by the inwardly facing groove upon the tapered outer surface of the split ring until the split ring is withdrawn from the inwardly facing groove, thereby releasing the first tubular body and the second tubular body;

the tubular insert carrying at least one key which is adapted to engage the axial keyway to prevent relative rotation of the first tubular body and the tubular insert, when the tubular insert is fully inserted into the first tubular body the at least one key underlies the split ring and prevents the split ring from having sufficient clearance to be withdrawn from the inwardly facing groove, thereby locking the first tubular body and the second tubular body together.

* * * * *